(12) United States Patent
Nakahara et al.

(10) Patent No.: US 7,196,983 B2
(45) Date of Patent: *Mar. 27, 2007

(54) INFORMATION RECORDING APPARATUS AND INFORMATION RECORDING METHOD

(75) Inventors: Masanori Nakahara, Tokorozawa (JP); Takao Sawabe, Tokorozawa (JP); Eisaku Kawano, Tokorozawa (JP)

(73) Assignee: Pioneer Corporation, Tokyo-to (JP)

( * ) Notice: Subject to any disclaimer, the term of this patent is extended or adjusted under 35 U.S.C. 154(b) by 289 days.

This patent is subject to a terminal disclaimer.

(21) Appl. No.: 10/762,313

(22) Filed: Jan. 23, 2004

(65) Prior Publication Data

US 2004/0156279 A1 Aug. 12, 2004

Related U.S. Application Data

(63) Continuation of application No. 09/823,980, filed on Apr. 3, 2001, now Pat. No. 6,724,703.

(30) Foreign Application Priority Data

Apr. 5, 2000 (JP) ............... P2000-104027

(51) Int. Cl.
*G11B 20/10* (2006.01)
(52) U.S. Cl. ............... 369/47.16; 369/47.22; 369/59.25; 369/83
(58) Field of Classification Search ............... None
See application file for complete search history.

(56) References Cited

U.S. PATENT DOCUMENTS 5,810,600 A * 9/1998 Okada ............... 434/185
5,982,727 A 11/1999 Kondo et al. ............ 369/53.24
6,014,495 A 1/2000 Moriyama et al. ...... 369/124.08
6,427,048 B2 * 7/2002 Ito et al. ............... 386/95
6,438,172 B1 * 8/2002 Nakamura et al. ......... 386/112
6,490,404 B1 12/2002 Kuroiwa et al. ............ 369/83
6,577,589 B1 6/2003 Sawabe et al. ......... 369/275.3

FOREIGN PATENT DOCUMENTS

| EP | 0 346 979 | 12/1989 |
| EP | 1 102 270 | 5/2001 |
| EP | 1 126 463 | 8/2001 |
| EP | 1 128 386 | 8/2001 |
| JP | 9-27170 | 1/1997 |
| WO | WO 99/34601 | 7/1999 |
| WO | WO 00/41178 | 7/2000 |
| WO | WO 00/75928 | 12/2000 |

* cited by examiner

*Primary Examiner*—Thang V. Tran
(74) *Attorney, Agent, or Firm*—Drinker Biddle & Reath LLP

(57) ABSTRACT

The present invention provides an information recording method and an information recording apparatus, which are capable of recording reproduction controlling information in information recording medium such as DVD. An operation portion designates a division timing in the audio information in case of dividing continuous audio information to record it in the DVD. A pickup records the audio information before the designated division timing and the audio information after the designated division timing in the DVD. A system controller repeats generating object recording sequence information in associated with the audio information before and after the division timing, respectively, to record them in the DVD every time when the division timing is designated.

32 Claims, 10 Drawing Sheets

FIG. 6B

AFTER DIVISION

| | | |
|---|---|---|
| PROGRAM CHAIN GENERAL INFORMATION | TRACK TOTAL NUMBER | ~60A |
| | CELL INFORMATION SEARCH POINTER TOTAL NUMBER | ~60B |
| 61 | FIRST TRACK INFORMATION | |
| 62 | SECOND TRACK INFORMATION | |
| 63 | THIRD TRACK INFORMATION | |
| 64 | FOURTH TRACK INFORMATION | |
| 65 | FIFTH TRACK INFORMATION | |
| 66 | FIRST CELL INFORMATION SEARCH POINTER | |
| 67 | SECOND CELL INFORMATION SEARCH POINTER | |
| 68 | THIRD CELL INFORMATION SEARCH POINTER | |
| 69 | FOURTH CELL INFORMATION SEARCH POINTER | |
| 70 | FIFTH CELL INFORMATION SEARCH POINTER | |
| 71 — FIRST CELL INFORMATION | FIRST CELL START TIME INFORMATION | ~71A |
| | FIRST CELL TERMINATION TIME INFORMATION | ~71B |
| 72 — SECOND CELL INFORMATION | SECOND CELL START TIME INFORMATION | ~72A |
| | SECOND CELL TERMINATION TIME INFORMATION | ~72B |
| 73 — THIRD CELL INFORMATION | THIRD CELL START TIME INFORMATION | ~73A |
| | THIRD CELL TERMINATION TIME INFORMATION | ~73B |
| 74 — FOURTH CELL INFORMATION | FOURTH CELL START TIME INFORMATION | ~74A |
| | FOURTH CELL TERMINATION TIME INFORMATION | ~74B |
| 75 — FIFTH CELL INFORMATION | FIFTH CELL START TIME INFORMATION | ~75A |
| | FIFTH CELL TERMINATION TIME INFORMATION | ~75B |

OSI'

FIG. 7

| | | | |
|---|---|---|---|
| 80 — | FIRST OBJECT GENERAL INFORMATION | FIRST AUDIO OBJECT START TIME INFORMATION | 00min00s — 80A |
| | | FIRST AUDIO OBJECT TERMINATION TIME INFORMATION | 10min00s — 80B |
| | | OTHER INFORMATION | — 80C |
| | | PREPARATIVE AREA | — 80D |
| 81 — | FIRST OBJECT UNIT INFORMATION | | |
| 82 — | SECOND OBJECT GENERAL INFORMATION | SECOND AUDIO OBJECT START TIME INFORMATION | 10min00s — 82A |
| | | SECOND AUDIO OBJECT TERMINATION TIME INFORMATION | 19min59s — 82B |
| | | OTHER INFORMATION | — 82C |
| | | PREPARATIVE AREA | — 82D |
| 83 — | SECOND OBJECT UNIT INFORMATION | | |
| 84 — | THIRD OBJECT GENERAL INFORMATION | THIRD AUDIO OBJECT START TIME INFORMATION | 00min00s — 84A |
| | | THIRD AUDIO OBJECT TERMINATION TIME INFORMATION | 15min00s — 84B |
| | | OTHER INFORMATION | — 84C |
| | | PREPARATIVE AREA | — 84D |
| 85 — | THIRD OBJECT UNIT INFORMATION | | |
| 86 — | FOURTH OBJECT GENERAL INFORMATION | FOURTH AUDIO OBJECT START TIME INFORMATION | 15min00s — 86A |
| | | FOURTH AUDIO OBJECT TERMINATION TIME INFORMATION | 25min00s — 86B |
| | | OTHER INFORMATION | — 86C |
| | | PREPARATIVE AREA | — 86D |
| 87 — | FOURTH OBJECT UNIT INFORMATION | | |
| 88 — | FIFTH OBJECT GENERAL INFORMATION | FIFTH AUDIO OBJECT START TIME INFORMATION | 25min00s — 88A |
| | | FIFTH AUDIO OBJECT TERMINATION TIME INFORMATION | 29min59s — 88B |
| | | OTHER INFORMATION | — 88C |
| | | PREPARATIVE AREA | — 88D |
| 89 — | FIFTH OBJECT UNIT INFORMATION | | |

INFORMATION RECORDING APPARATUS AND INFORMATION RECORDING METHOD

This is a continuation application of application Ser. No. 09/823,980 filed on Apr. 3, 2001 now U.S. Pat. No. 6,724,703, which is incorporated by reference herein in its entirety.

BACKGROUND OF THE INVENTION

1. Field of the Invention

The present invention relates to a technical field of an information recording method and an information recording apparatus. More specifically, the invention relates to a technical field of an information recording method and an information recording apparatus, which record both of recording information to be recorded and reproduction controlling information for controlling a reproduction manner upon reproducing the foregoing recording information after recording in one information recording medium.

2. Description of the Related Art

Recently, research and development regarding a DVD, which is an optical disk having severalfold recording capacity than that of a conventional CD (Compact Disk), has been done extensively.

A reproduction-only DVD in which a movie or the like is recorded is popular. However, in addition to this, a standard of a DVD in which video information such as moving image information and voice information or the like are capable of being recorded (hereinafter, referred to as video DVD), and a standard of a DVD in which audio information including music information and voice information or the like are capable of being recorded (hereinafter, referred to as audio DVD), are being plotted out as a standard of a DVD capable of recording.

In a video DVD standard of which plotting out has been nearly completed, video information which is recorded from start of recording to end thereof by a user (i.e., video information in a range capable of being identified by the user as one group) is recorded as one group in a DVD. In this case, upon recording the video information, reproduction controlling information for controlling a reproduction manner of the video information, which includes a reproduction order, a reproduction time or the like, is also generated simultaneously and it is standardized that the generated reproduction controlling information is recorded in the DVD together with the video information. The reproduction controlling information is also referred to as navigation information in the video DVD standard.

On the other hand, in the case that a group of the video information which is recorded once (hereinafter, referred to the group of the video information as source video information) is video information capable of being obtained by receiving, for example, television broadcast or the like, a portion of the video information, specifically, for example, a commercial message part, may be required to be deleted after completion of recording the source video information.

In such a case, a video DVD recorder on sale which employs the standard of the video DVD is configured in such a manner that this video DVD recorder deletes a portion of the source video information in accordance with an instruction from the user, divides source video information and edits the reproduction controlling information (hereinafter, referred to the reproduction controlling information as source video reproduction controlling information) in response to the source video information so as to reproduce the divided source video information as one group, namely, to reproduce it as what is called one program.

On the other hand, an audio DVD recorder employing the audio DVD standard, whose standardization is in progress, is also expected to be sold. However, in the case that one group of the audio information, which is recorded after recording (hereinafter, referred to the group of the audio information as source audio information), is divided by deleting a portion thereof in this audio DVD recorder or the like, if the dividing concept with respect to the above source video information is intended to be employed as it is, it can be considered to edit the reproduction controlling information in response to the source audio information (hereinafter, referred to the reproduction controlling information as source audio reproduction controlling information) so as to reproduce all of the audio information after dividing as one group.

However, especially, for the audio information, there is a case that applying a concept for dividing the above described video information is inappropriate.

In other words, for example, in the case that the source audio information is obtained by copying a plurality of music pieces recorded in one piece of CD as they are, one group of the plural songs is recorded as the source audio information. Further, the corresponding source audio reproduction controlling information is also recorded so as to control reproduction of the plural songs as one group.

In this case, in order to edit new reproduction controlling information so as to extract and reproduce only a part of the plural songs, it is necessary to designate a recording position of a song to be reproduced from a head of the source audio information. Simultaneously, also in the case of searching the recording position, at first, it is necessary to start reproduction from a head of the source audio information. As a result, this involves a problem such that an unnecessary time is required to search the song and convenience is extremely lowered upon editing new reproduction controlling information.

SUMMARY OF THE INVENTION

The present invention has been made taking the foregoing problem into consideration, an object of the invention is to provide an information recording method and an information recording apparatus, which are capable of recording reproduction controlling information or the like in such a manner that it is possible to improve convenience upon controlling a reproduction manner of recording information.

The above object of the present invention can be achieved by an information recording apparatus for recording information to be recorded in an information recording medium and generating reproduction controlling information for controlling a reproduction manner upon reproducing the recording information after recording at the time of recording of the recording information to record it in the information recording medium as well as the recording information in accordance with the present invention. The information recording apparatus is provided with: a designating device for designating division timing in the recording information in case of dividing continuous recording information to record it in the information recording medium; a recording device for recording former part recording information which is the recording information before the designated division timing, and latter part recording information which is the recording information after the designated division timing, in the information recording medium; and a generating and recording device for repeating generating former reproduction controlling information which is the reproduction controlling information in associated with the former part recording information, and latter reproduction controlling information which is the reproduction controlling information in associated with the latter part recording information to record them in the information recording medium every time when the division timing is designated.

According to the information recording apparatus of the present invention, the designating device designates division timing in the recording information in case of dividing the continuous recording information to record it in the information recording medium. Then, the recording device records the former part recording information which is the recording information before the designated division timing in the information recording medium. Further, the recording device records the latter part recording information which is the recording information after the designated division timing in the information recording medium. Then, the generating and recording device repeats generating the former reproduction controlling information which is the reproduction controlling information in associated with the former part recording information, and the latter reproduction controlling information which is the reproduction controlling information in associated with the latter part recording information to record them in the information recording medium every time when the division timing is designated.

Therefore, it is possible to divide original recording information to record in the information recording medium in such a manner that the user desires. Simultaneously, it is possible to record the former reproduction controlling information and the latter reproduction controlling information for dividing and reproducing the recording information in such a manner that the user desires. Further, it becomes possible to improve convenience upon controlling the reproduction manner by the use of the reproduction controlling information.

The above object of the present invention can be achieved by an information recording apparatus for newly generating division reproduction controlling information which is reproduction controlling information for dividing and reproducing the recording information from an information recording medium, in which continuous recording information and the reproduction controlling information for controlling the reproduction manner of the recording information are recorded, to record it in the information recording medium in accordance with the present invention. The information recording apparatus is provided with: a designating device for designating a division timing in the recording information; and a generating and recording device for repeating newly generating former reproduction controlling information which is the reproduction controlling information, in associated with former part recording information which is the recording information before the designated division timing, and latter reproduction controlling information which is the reproduction controlling information in associated with latter part recording information which is the recording information after the designated division timing, to record them as the division reproduction controlling information in the information recording medium every time when the division timing is designated.

According to the information recording apparatus of the present invention, the designating device designates the division timing in the recording information. Then, the generating and recording device repeats newly generating the former reproduction controlling information which is the reproduction controlling information, in associated with former part recording information which is the recording information before the designated division timing, and the latter reproduction controlling information which is the reproduction controlling information in associated with latter part recording information which is the recording information after the designated division timing, to record them as the division reproduction controlling information in the information recording medium every time when the division timing is designated.

Therefore, it is possible to record the division reproduction controlling information for dividing and reproducing the original recording information in such a manner that the user desires. Simultaneously, it becomes possible to improve convenience upon controlling the reproduction manner by the use of the reproduction controlling information.

In one aspect of the present invention, the designating device comprises a reproduction designating device. The reproduction designating device designates the division timing while reproducing the recording information, which is recorded.

According to this aspect, it is possible to generate the former reproduction controlling information and the latter reproduction controlling information while the user is confirming the contents of the recording information.

In another aspect of the present invention, the former reproduction controlling information includes order information to indicate a reproduction order of the former part recording information and range information to indicate a range where the former part recording information is recorded in the recording information. The reproduction controlling information also includes the latter reproduction controlling information includes order information to indicate a reproduction order of the latter part recording information and range information to indicate a range where the latter part recording information is recorded in the recording information.

According to this aspect, it is possible to certainly reproduce the former part recording information and the latter part recording information in such a reproduction manner that the user desires.

In another aspect of the present invention, the recording information comprises audio information including at least music information and voice information.

According to this aspect, for example, one song of the audio information is capable of being reproduced as any one of the former part recording information and the latter part recording information.

In another aspect of the present invention, the information recording medium is a DVD capable of recording the information.

According to this aspect, large quantity of audio information is capable of being recorded and simultaneously this is capable of being reproduced in such a manner that the user desires.

The above object of the present invention can be achieved by an information recording method of recording information to be recorded in an information recording medium and generating reproduction controlling information for controlling a reproduction manner upon reproducing the recording information after recording at the time of recording of the recording information to record it in the information recording medium as well as the recording information in accordance with the present invention. The information recording method is provided with the processes of: designating a division timing in the recording information in case of dividing continuous recording information to record it in the information recording medium; recording former part recording information which is the recording information before the designated division timing, and latter part recording information which is the recording information after the designated division timing, in the information recording medium; and repeating generating former reproduction controlling information which is the reproduction controlling information in associated with the former part recording information, and latter reproduction controlling information which is the reproduction controlling information in associated with the latter part recording information to record them in the information recording medium every time when the division timing is designated.

According to the information recording method of the present invention, the division timing in the recording information is designated in case of dividing continuous recording information to record it in the information recording medium. Then, the former part recording information which is the recording information before the designated division timing is recorded in the information recording medium. Also, the latter part recording information which is the recording information after the designated division timing is recorded in the information recording medium. Then, the former reproduction controlling information which is the reproduction controlling information in associated with the former part recording information is generated. Also, the latter reproduction controlling information which is the reproduction controlling information in associated with the latter part recording information to record them in the information recording medium is generated. These processes of generating the former reproduction controlling information and the latter reproduction controlling information are repeated every time when the division timing is designated.

Therefore, it is possible to divide the original recording information to record in the information recording medium in such a manner that the user desires. Simultaneously, it is possible to record the former reproduction controlling information and the latter reproduction controlling information for dividing and reproducing the recording information in such a manner that the user desires. Further, it becomes possible to improve convenience upon controlling the reproduction manner by the use of the reproduction controlling information.

The above object of the present invention can be achieved by an information recording method of newly generating division reproduction controlling information which is reproduction controlling information for dividing and reproducing the recording information from an information recording medium, in which continuous recording information and the reproduction controlling information for controlling the reproduction manner of the recording information are recorded, to record it in said information recording medium in accordance with the present invention. The information recording method is provided with the processes of: designating a division timing in the recording information; and repeating newly generating former reproduction controlling information which is the reproduction controlling information in associated with the former part recording information which is the recording information before the designated division timing, and the latter reproduction controlling information which is the reproduction controlling information in associated with the latter part recording information which is the recording information after the designated division timing, to record them as the division reproduction controlling information in the information recording medium every time when the division timing is designated.

According to the information recording method of the present invention, the division timing in the recording information is designated. Then, the former reproduction controlling information which is the reproduction controlling information in associated with the former part recording information which is the recording information before the designated division timing is newly generated. Also, the latter reproduction controlling information which is the reproduction controlling information in associated with the latter part recording information which is the recording information after the designated division timing is newly generated. Further, the generated former reproduction controlling information and the generated latter part recording information are recorded as the division reproduction controlling information in the information recording medium. Moreover, these processes are repeated every time when the division timing is designated.

Therefore, it is possible to record the division reproduction controlling information for dividing and reproducing the original recording information in such a manner that the user desires. Simultaneously, it becomes possible to improve convenience upon controlling the reproduction manner by the use of the reproduction controlling information.

In one aspect of the present invention, the process of designating the division timing designates the division timing while reproducing the recording information, which is recorded.

According to this aspect, it is possible to generate the former reproduction controlling information and the latter reproduction controlling information while the user is confirming the contents of the recording information.

In another aspect of the present invention, the former reproduction controlling information includes order information to indicate a reproduction order of the former part recording information and range information to indicate a range where the former part recording information is recorded in the recording information; and the latter reproduction controlling information includes order information to indicate a reproduction order of the latter part recording information and range information to indicate a range where the latter part recording information is recorded in the recording information.

According to this aspect, it is possible to certainly reproduce the former part recording information and the latter part recording information in such a reproduction manner that the user desires.

In another aspect of the present invention, the recording information comprises audio information including at least music information and voice information.

According to this aspect, for example, one song of the audio information is capable of being reproduced as any one of the former part recording information and the latter part recording information.

In another aspect of the present invention, the information recording medium is a DVD capable of recording the information.

According to this aspect, large quantity of audio information is capable of being recorded and simultaneously this is capable of being reproduced in such a manner that the user desires.

BRIEF DESCRIPTION OF THE DRAWINGS

FIG. 6B is a diagram (II) for illustrating object recording sequence information after track dividing processing according to the present embodiment;

FIG. 7 is a diagram (III) for explaining track dividing processing according to the present embodiment;

DESCRIPTION OF THE PREFERRED EMBODIMENTS

Next, preferred embodiments of the present invention will be explained below with reference to the drawings.

Additionally, the embodiments to be explained below is based upon the above audio DVD standard for recording audio information in a DVD, simultaneously, in the present embodiment, the present invention is employed for editing or generating reproduction controlling information (specifically, object recording sequence OSI to be described later) in the standard.

(I) Audio DVD Standard

Before explaining embodiments according to the present invention, at first, the standard of the audio DVD to which the present embodiment is employed will be described with reference to FIG. 1 and FIG. 2.

Figure 1:
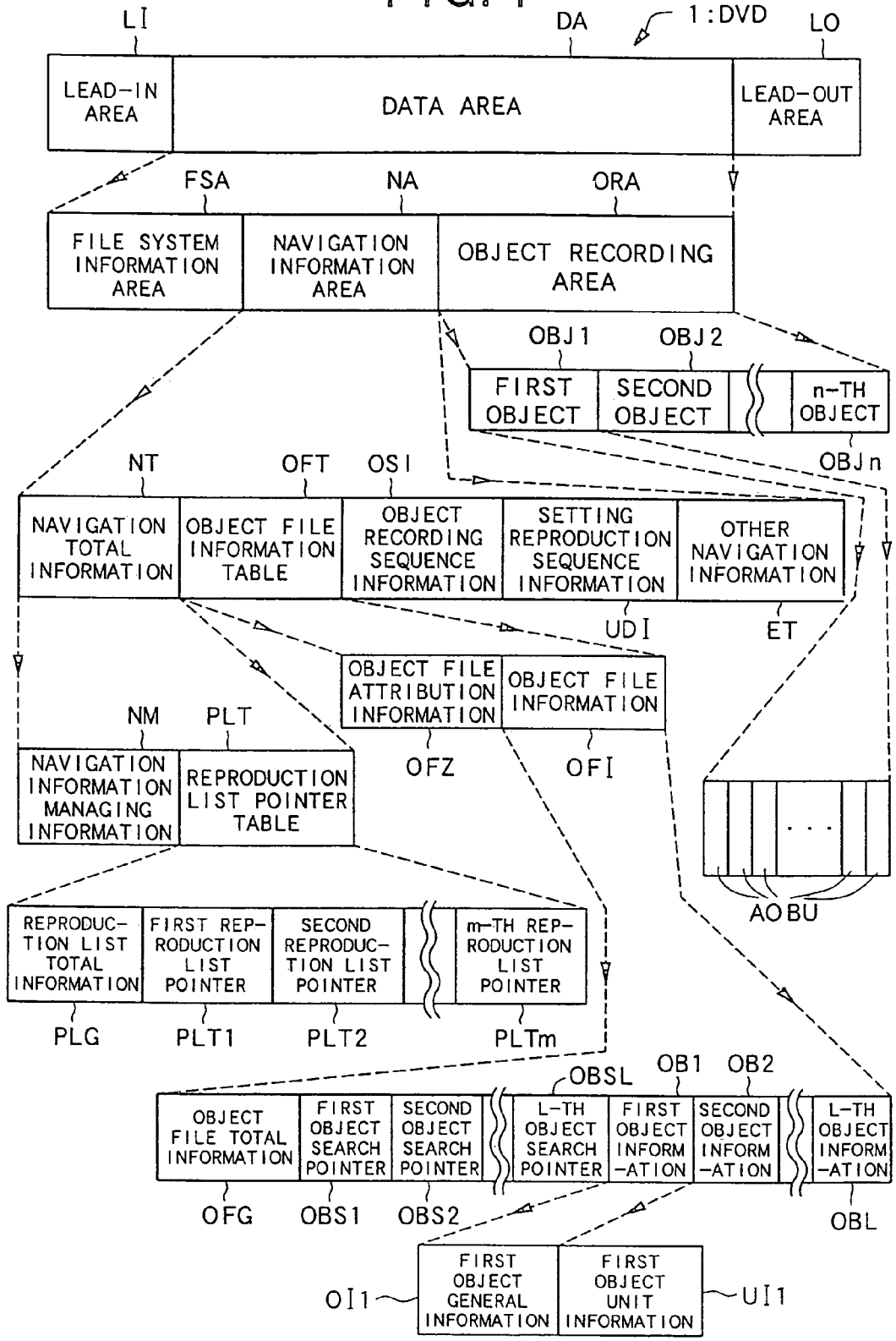
FIG. 1 is a diagram for showing a physical format in an audio DVD standard.

FIG. 1 is a diagram for showing a physical format in a DVD after the audio information is recorded on the basis of the standard of the audio DVD (i.e., specifically, a physical format for showing a recording positions or the like in the DVD of the respective information). FIG. 2 is a diagram for showing a logical recording format generated so as to control the reproduction manner of the audio information recorded in the DVD (i.e., specifically, connection of the respective information upon reproduction and the recording positions on the DVD of respective information to be connected).

At first, the physical format in the audio DVD standard will be described with reference to FIG. 1. In FIG. 1, DVD 1 is a DVD capable of recording such as a DVD-R (DVD-Recordable) which can be rewritten only once or a DVD-RW (DVD-Recordable) which can be rewritten in plural times.

As shown in FIG. 1, according to the standard of the audio DVD, a lead-in area LI, a data area DA and a lead-out area LO are formed from its inner radius in the DVD 1. In the lead-in-area LI, starting information or the like, which is controlling information to start reproduction of the information in the DVD is recorded. In the data area DA, reproduction controlling information to control the audio information to be reproduced in practice and the reproduction manner of the audio information is recorded. The reproduction controlling information is specifically reproduction controlling information showing reproduction order of respective information constructing the audio information and reproduction time or recording positions on the DVD or the like. In the lead-out-area LO, termination information or the like, which is controlling information to terminate reproduction of the audio information is recorded.

Next, a file system information area FSA, a navigation information area NA and an object recording area ORA are formed in the above data area DA.

Among the above areas, in the object recording area ORA a plurality of audio objects (AOB) which are the audio information itself to be recorded are recorded. In this case, a series of audio information, which is recorded during a period from recording is commenced once until it is terminated, corresponds to an audio object just after the recording is terminated. In other words, audio objects are formed in the object recording area ORA one by one every time a series of the audio information is completely recorded.

Alternatively, FIG. 1 shows a state that n pieces of audio objects are recorded as a first object OBJ1 to OBJn with being numbered, respectively.

Additionally, in a logical format to be described later, a series of audio objects which are recorded in the DVD 1 during a period from recording is commenced once until it is terminated, is referred to as a track.

Next, one audio object is comprised of a plurality of audio object units AOBU. In this case, the audio object unit AOBU is recorded by segmenting the audio object for every period of time (for example, for every second) upon recording.

Alternatively, upon recording of the audio information, this audio object unit AOBU becomes the minimum unit for edition or deletion of the audio object.

On the other hand, in the navigation information area NA in the data area DA, the reproduction controlling information is recorded as the navigation information to control the reproduction manner of the audio information recorded in the object recording area ORA to be described later.

Further, in the file system information area FSA, system information is recorded to store the above navigation information by hierarchical structure in filling format in the navigation information area NA.

Next, as the navigation information in the navigation information area NA, navigation total information NT, an object file information table OFT, object recording sequence information OSI, setting reproduction sequence information UDI and other navigation information ET are recorded.

Among the above information, the navigation total information NT is comprised of navigation information managing information NM, which is also called General Information (GI), and a reproduction list pointer table PLT. The navigation information managing information NM is total information of the DVD 1 for managing a storing position (recording position) in respective sequences in the navigation information area NA or in the navigation information area NA of the information table, and a recording starting position of the object recording area ORA or the like. The reproduction list pointer table PLT indicates a corresponding relation between the navigation information stored in the setting reproduction sequence information UDI and a reproduction list (referred to as play list (PL) in the audio DVD standard) to be described later.

Next, the object file information table OFT is comprised of object file attribution information OFZ and object file information OFI. The object file attribution information OFZ comprises variety of objects to be recorded in the object recording area ORA and the attribution information related to this variety or the like. The variety of objects indicates that objects to be recorded in the object recording area ORA is an audio object in the case of the present embodiment. The object file information OFI comprises a reproduction start time and a reproduction termination time of respective objects (audio object), which are the ones in which a head of the first object OBJ1 is defined as a start point, and the information related to them, or the like.

Further, in the object file information OFI, various information related to one or a plurality of the above audio objects recorded on the DVD 1 is recorded. Specifically, the various information is comprised of object file total information OFG, L pieces of object search pointers OBS (L is the number of the audio objects, which are recorded in the DVD 1) and L pieces of object information OBS (namely, as many as the object search pointer OBS). The object file total information OFG includes total number or the like on the DVD 1 of the audio object at the moment. The address information of heads of respective audio objects to be searched (reproduced) in the reproduction processing or the like to be described later, are described in the object search pointers OBS. The address information or the like indicating a recording position on the DVD 1 of heads of respective audio objects are described in the reproduction processing or the like in the object information OBS.

Furthermore, respective object information OBS are comprised of object general information OI and object unit information UI. The object general information OI comprises a reproduction start time and a reproduction termination time of respective objects and the information related to them. The object unit information UI comprises information such as a reproduction time of the audio object unit AOBU constructing respective audio objects, a recording start address or a size thereof or the like.

Next, the object recording sequence OSI is referred to as an original program chain (ORG-PGC) in the audio DVD standard. The object recording sequence OSI is information indicating a recording sequence of respective audio objects. Namely, it indicates in what order, what audio information is recorded in the DVD 1 as the audio object in the beginning of recording.

Additionally, the above described object file information table OFT and the object recording sequence OSI are newly generated, updated and recorded every time a new audio object is recorded in the DVD 1. Due to these information, a user is capable of reproducing them by the order and the reproduction time as same as those in the case that respective audio objects are recorded.

On the other hand, the setting reproduction sequence information UDI is referred to as a user defined program chain (UD-PGC) in the audio DVD standard. The user generates one or plural setting reproduction sequence information UDI in order to reproduce logically all or a part of the recorded audio objects in a mutual, free and original combination. The setting reproduction sequence information UDI are recorded with being numbered every time the user newly sets them. In this case, the user defined program chain is associated with the reproduction list described above.

Further, other navigation information ET is comprised of the information necessary for controlling reproduction in addition to the above described respective navigation information.

Next, pointer information is recorded as a reproduction list pointer table PLT. The pointer information shows a corresponding relation between the number of one or a plurality of the above setting reproduction sequence information UDI, which are recorded on the DVD 1 at the moment, and the number of the reproduction list set by the user. Specifically, the reproduction list pointer table PLT is comprised of play list total information PLG and a first to m-th reproduction list pointers PLT 1 to PLT m. The play list total information PLG includes a final address or the like in a region on the DVD 1 where the total number at the moment of the pointer information and the reproduction list pointer table PLT are recorded. The reproduction list pointers PLT 1 to PLT m indicate the numbers of the setting reproduction sequence information UDI, which are associated with the first to the m-th reproduction lists set by the user in the above setting reproduction sequence information UDI, respectively.

Next, a logical format for logically controlling a reproduction manner upon reproducing the audio information, which is recorded in the DVD 1 in accordance with the above described physical format, will be described with reference to FIG. 2. The reproduction manner includes the reproduction order or a range of the audio information to be reproduced in the audio information.

Figure 2:
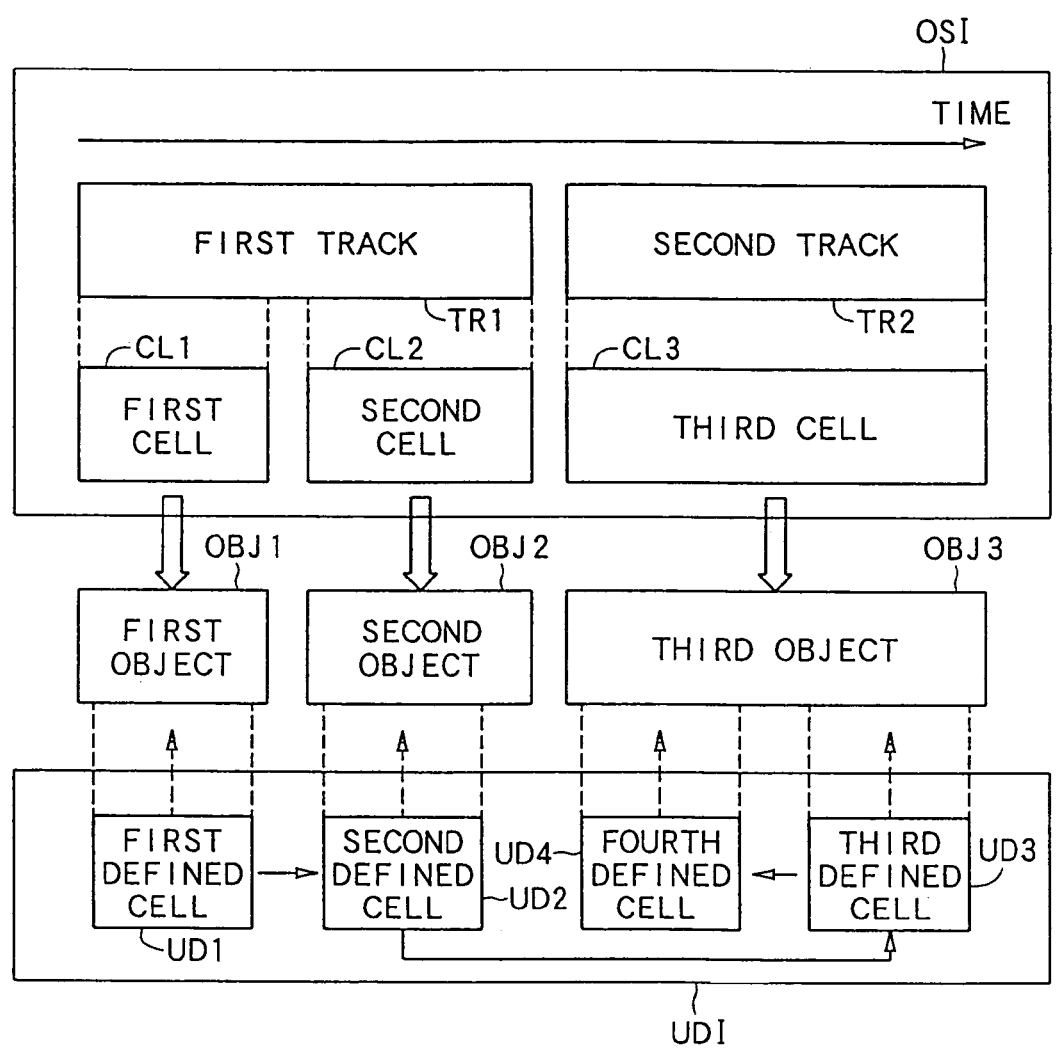
FIG. 2 is a diagram for showing a logical format in an audio DVD standard.

FIG. 2 is a diagram for showing the logical format in a hierarchical structure. However, the audio information on the DVD 1 is recorded in a manner as shown in FIG. 1 and the logical format is obtained as a result that a range and a reproduction order of the audio information to be reproduced are described by using the above respective navigation information in a hierarchical structure, as described above.

At first, a logical format of the above object recording sequence information OSI will be described.

As described above, the object recording sequence information OSI is information indicating a recording sequence of respective audio objects. However, in the case of reproducing the audio objects on the basis of the object recording sequence information OSI, the user may be allowed only to reproduce the audio objects in an order of recording, so that there is only one reproduction manner.

In other words, a first track TR1 is recorded prior to a second track TR2 in FIG. 2. However, in this case, a reproduction order capable of being set as the object recording sequence information OSI has only an order from the first track TR1 to the second track TR2. The first track TR1 is a track corresponds to a series of the audio objects to be recorded in the DVD 1 during a period from recording is commenced once until it is terminated as described above.

Further, one track TR is logically comprised of one or a plurality of of cells CL. The cells CL are all or a part of one track. In one cell CL, the audio information is standardized such that they should be successive. In other words, one track TR is comprised of one cell CL or more.

Assuming that, for example, a broadcast program for an hour is recorded in the DVD 1 as the audio object, one track TR is comprised of only one cell CL as shown in the second track TR2 and the third cell CL3 of FIG. 2 in this state.

On the other hand, in the case that the object recording sequence OSI is set in such a manner that the track TR is divided before and after a part of the formed one track TR so that a part of the formed one track TR is not capable of being reproduced after the recording, it is only standardized that the cell CL is divided before and after a part, which is not capable of being reproduced in the audio DVD standard (refer to the first track TR1, the first cell CL1 and the second cell CL2 in FIG. 2). For example, the case corresponds to a case that the audio object corresponding to a period of a commercial message during the broadcast program has been on air is deleted so that it cannot be reproduced, or one track TR is divided for each song after this one track TR is formed by plurality of songs or the like.

In the above case, as described later, according to the present embodiment, the object recording sequence information OSI is edited so that the track TR itself is divided in accordance to division of the cell CL (refer to FIG. 5 to be described later).

Next, in a relation between respective cells CL physically configured, and respective audio objects logically formed, one cell CL is ordinary associated with one audio object as shown in FIG. 2. Therefore, for example, if one cell CL is deleted on the object recording sequence information OSI, a corresponding audio object also becomes unnecessary to be reproduced.

Further, a logical format of the above setting reproduction sequence information UDI will be described.

As described above, the setting reproduction sequence information UDI (user defined program chain) is also referred to as a reproduction list in the audio DVD standard. The user sets and records the setting reproduction sequence information UDI so that the user can arbitrarily reproduce a part or all of a plurality of audio objects in an arbitrary order.

In the above case, the above described track TR does not exist in the setting reproduction sequence information UDI. Further, it is possible to set a plurality of setting reproduction sequence information UDI.

Next, one setting reproduction sequence information UDI is logically comprised of one or a plurality of defined cells UD as shown in FIG. 2. In this case, one defined cell UD comprises information, which logically shows reproduction segments arbitrarily set by the user (reproduction segments as a part of the respective audio objects) and a reproduction order between respective reproduction segments. This defined cell UD is set so as to reproduce respective audio objects with making reference to them. This is an artifice in a standard to realize a plurality of reproduction manners with changing original audio objects as little as possible.

More specifically, as shown in FIG. 2, logically setting a first defined cell UD1, a second defined cell UD2, a third defined cell UD3 and a fourth defined cell UD4, then, one setting reproduction sequence information UDI is comprised of defining these defined cells so that they are reproduced in such an order that the first defined cell UD1, the second defined cell UD2, the third defined cell UD3, and the fourth defined cell UD4. The first defined cell UD1 designates a part of the first object OBJ1 as a reproduction segment. The second defined cell UD2 designates a part of the second object OBJ1 as a reproduction segment. The third defined cell UD3 and the fourth defined cell UD4 designate various parts of the third object OBJ3, respectively, as reproduction segments.

(II) Embodiment

Next, an embodiment according to the present invention will be described with reference to FIG. 3 to FIG. 8.

Figure 3:
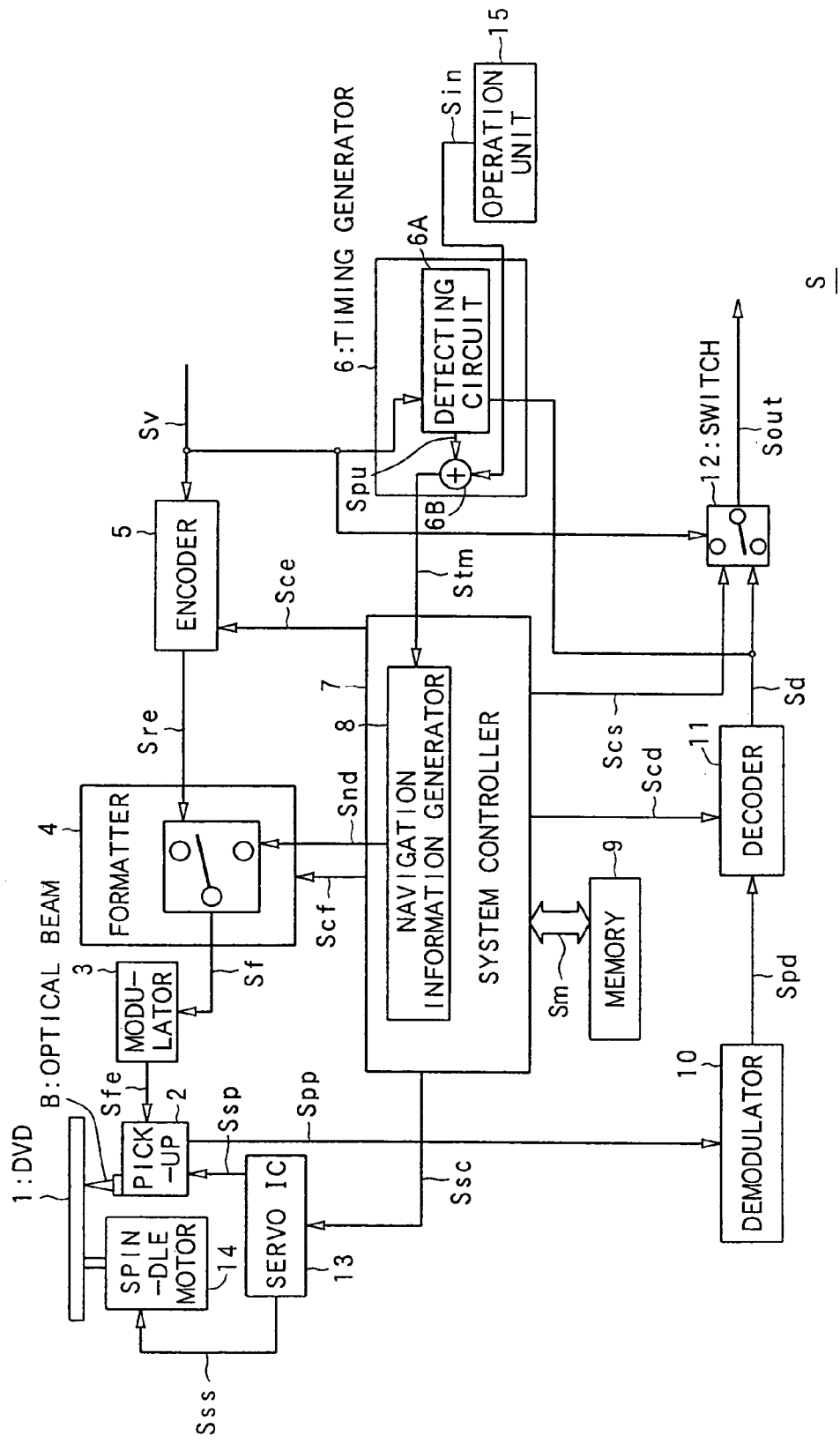
FIG. 3 is a block diagram for showing a schematic configuration of an information recording reproduction apparatus according to one embodiment of the present invention.

At first, a schematic configuration of an information recording reproduction apparatus according to the present embodiment will be described with reference to FIG. 3. FIG. 3 is a block diagram for showing a schematic configuration of the information recording reproduction apparatus.

As shown in FIG. 3, an information recording reproduction apparatus S according to the embodiment is comprised of a pickup 2 as a recording device, a modulator 3, a formatter 4, an encoder 5, a timing generator 6, a system controller 7 as a generating and recording device, a memory 9, a demodulator 10, a decoder 11, a switch 12, a servo IC (Integrated Circuit) 13, a spindle motor 14 and an operation unit 15 as a designation device and a reproduction designation device.

Additionally, the system controller 7 is provided with a navigation information generator 8.

Further, the timing generator 6 is comprised of a detecting circuit 6A and an addition circuit 6B.

Next, schematic operations of respective units will be explained below.

The spindle motor 14 rotates the DVD 1 with predetermined number of revolutions on the basis of a spindle controlling signal Sss from the servo IC13.

On the other hand, recording information Sr including the audio information to be recorded in the DVD 1 is inputted from the outside, then, it is inputted in the encoder 5, one input terminal of the switch 12 and the detecting circuit 6A.

Further, the encoder 5 performs a predetermined encoding processing, which is specifically, for example, compression encoding processing in an MPEG (Moving Picture Experts. Group) system, with respect to the recording information Sr on the basis of a controlling signal Sce from the system controller 7 and generates a encoding signal Sre to output it to the formatter 4.

Thus, the formatter 4 superimposes a navigation information signal Snd from the navigation information generator 8 to be described later and the above encoding signal Sre on the basis of a controlling signal Scf from the system controller 7 so that they are formed in a physical format. Then, the formatter 4 generates a superimposed signal Sf to output it to the modulator 3.

After that, the modulator 3 provides the superimposed signal Sf with predetermined modulation processing, which is specifically, for example, 8–16 modulation processing, and generates a modulation signal Sfe to outputted it to the pickup 2.

Thus, the pickup 2 generates an optical beam B, whose strength is modulated by the modulation signal Sfe, and irradiates it to an information track in an information recording surface (not illustrated) of the DVD 1, so that pits in associated with the navigation information, which is included in the modulation signal Sfe, and the audio information are generated on the information track. Thus, the pickup 2 records the navigation information and the audio information on the DVD 1 in a physical format shown in FIG. 1.

In the above case, an objective lens (not illustrated) in the pickup 2 (an objective lens for condensing the optical beam B) is moved in the above vertical and horizontal directions on the basis of a pickup servo signal Ssp to be outputted from the servo IC 13. Namely, focus servo controlling and tracking servo controlling are performed. As a result, the declination between a condensing position of the optical beam B and the above information track in a vertical and horizontal directions with respect to the above information recording surface is dissolved.

Therefore, the servo IC13 generates the above spindle controlling signal Sss and a pickup servo signal Ssp on the basis of a controlling signal Ssc from the system controller 7 to output these signals to the spindle motor 14 and the pickup 2, respectively.

On one hand, in the case of reproducing the audio information or the like, which has been already recorded in the DVD 1, the pickup 2 generates the optical beam B to be reproduced having certain strength and irradiates it to the information track in which the above pits are formed. Then, the pickup 2 generates a detecting signal Spp in associated with the audio information or the like on the basis of its reflection light and outputs it to the demodulator 10.

Thus, the demodulator 10 provides the detecting signal Spp with demodulation processing in associated with the modulation processing in the above modulator 3, and generates a demodulation signal Spd to output it to the decoder 11.

Then, the decoder 11 provides the demodulation signal Spd with decoding processing in associated with the encoding processing in the above encoder 5 on the basis of a controlling signal Scd from the system controller 7, and generates a decoding signal Sd to output it to other input terminal of the switch 12 and the detecting circuit 6A.

After that, the switch 12 selects any one of the above recording information Sr and the above decoding signal Sd on the basis of a controlling signal Scs from the system controller 7 and outputs it to an exterior amplifier or the like (not illustrated) as an output signal Sout.

Alternatively, in the editorial processing of the embodiment to be described later, the switch 12 is always switched to a decoding signal Sd's side.

On the other hand, the operation unit 15 generates an operation signal Sin in associated with the operation and outputs it to the system controller 7 through the timing generator 6 when the operation is performed by the user to perform the processing in the information recording reproduction apparatus S.

Upon performing the editorial processing of the embodiment to be described later, when the operation is performed to divide respective tracks TR, the operation unit 15 generates the operation signal Sin indicating that respective tracks TR are divided in this timing.

Next, upon performing the above editorial processing, the timing generator 6 generates a timing signal Stm indication a timing at which the edition should be performed on the basis of the above recording information Sr, the decoding signal Sd and the operation signal Sin output this signal to the navigation information generator 8.

More specifically, the detecting circuit 6A in the timing generator 6 detects the recording information Sr and a silent portion of the decoding signal Sd, and generates a detecting signal Spu to output it to the addition circuit 6B. Then, the addition circuit 6B adds the detecting signal Spu and an operation signal Sh from the operation unit 15, and generates the above timing signal Stm to output it.

Thus, the timing signal Stm is outputted to the navigation information generator 8 at both of a timing that the above dividing operation is performed in the operation unit 15 and a timing that the detecting circuit 6A detects the recording information Sr and the silent portion of the decoding signal Sd.

Alternatively, in the case that the recording information Sr has boundary information showing a boundary of a song in its data, the detecting circuit 6A detects this boundary information.

Thus, the navigation information generator 8 generates the above navigation information signal Snd including the above respective navigation information after the editorial processing on the basis of the timing signal Stm and outputs it to one input terminal of the formatter 4.

As a result, the audio-information in the-encoding signal Sre and the navigation information in the navigation information signal Snd are superimposed by the above formatter 4, so that the above superimposed signal Sf including the audio information or the like, which has the physical format shown in FIG. 1, is generated.

In parallel with these operations, the system controller 7 gives and receives information necessary as a memory signal Sm to and from the memory 9, generates respective controlling signals Sce, Scf, Ssc, Scd and Scs for controlling the above respective operations and outputs them to component materials in associated with respective controlling signals.

Next, editorial processing of the object recording sequence information OSI according to the embodiment will be explained with reference to FIG. 4 to FIG. 6.

Additionally, the editorial processing to be described below edits the track TR, which is recorded once in the DVD 1 in accordance with the physical format shown in FIG. 1, and the object recording sequence information OSI in associated with the track TR so that they are divided after the recording.

Figure 4:
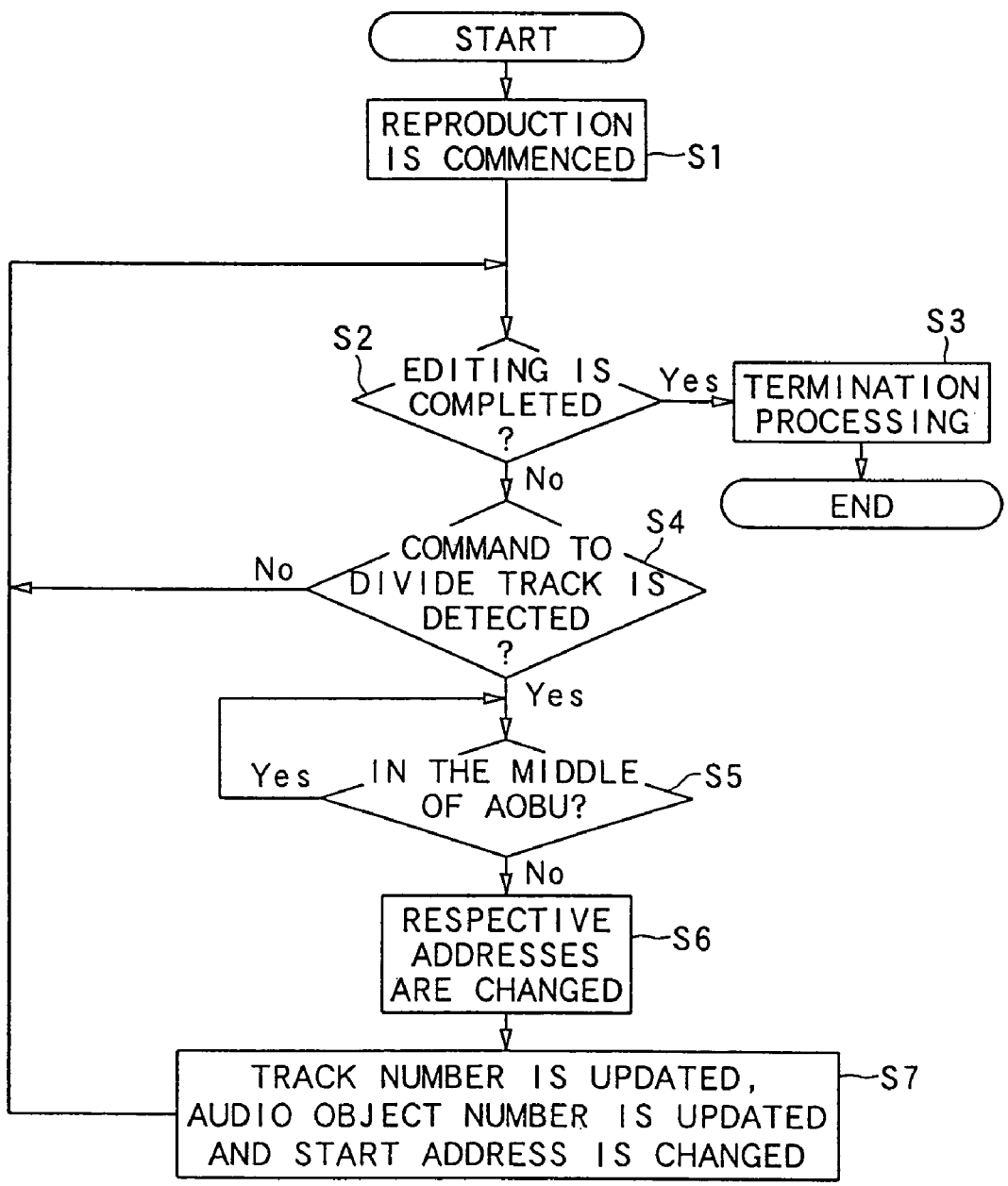
FIG. 4 is a flow chart for showing editorial processing according to the present embodiment.

Alternatively, FIG. 4 is a flow chart for showing the editorial processing, which is mainly performed in the system controller 7. FIG. 5 and FIG. 6 are diagrams for specifically illustrating the object recording sequence information OSI before and after the division.

As shown in FIG. 3, according to the editorial processing of the present embodiment, at first, reproduction of the audio information, which has been already recorded in the DVD 1 as the track TR (a track TR to be divided), is commenced (step S1). In this case, the switch 12, which has been switched to the decoding signal Sd's side, reproduces the audio information via the pickup 2, the demodulator 10, the decoder 11 and the switch 12.

If reproduction of the audio information is commenced, then, it is determined whether the desired dividing processing, i.e., the editorial processing of the object recording sequence information OSI is completed or not (step S2). If it is all completed (step S2; YES), termination processing is performed (step S3) and the editorial processing is terminated. For example, the termination processing includes the processing of recording of the termination information to be recorded in the lead-out area LO or the like.

On one hand, in the determination in the step S2, if all of the editorial processing is not completed (step S2; NO), then, it is determined whether or not the operation signal Sin indicating that the track TR is divided is inputted from the operation unit 15 (step S4). Further, if the operation signal Sin is not inputted (step S4; NO), the processing returns to the step S2 so as to wait until the operation signal Sin is inputted. On the contrary, if it is inputted (step S4; YES), then, it is determined whether or not the division timing indicated by the timing signal Stm in associated with the operation signal Sin is a timing in the middle of reproduction of one audio object unit AOBU (step S5).

Further, if the division timing is a timing in the middle of reproduction of one audio object unit AOBU (step S5; YES), the processing waits until a timing that the reproduction of the audio object unit AOBU is terminated comes since it is assumed that the editorial or deletion processing or the like is not performed in the middle of one audio object unit AOBU as described above.

On the other hand, if the division timing indicated by the timing signal Stm is not a timing in the middle of one audio object unit AOBU (step S5; NO), then, the address information in a recording termination position in the audio object to be reproduced before the division timing in the corresponding object recording sequence information OSI and a reproduction termination time of the cell CL to be reproduced before the division timing are changed on the object recording sequence information OSI (step S6). Simultaneously, updating of a track number of a new track TR, of which the reproduction is commenced after the division timing, and the audio object number and rewriting of the address information of the address information in the recording start position of the new track TR are performed on the object recording sequence information OSI (step S7). Then, at the next division timing, the processing returns to step S2 so as to repeat the same processing.

Figure 5:
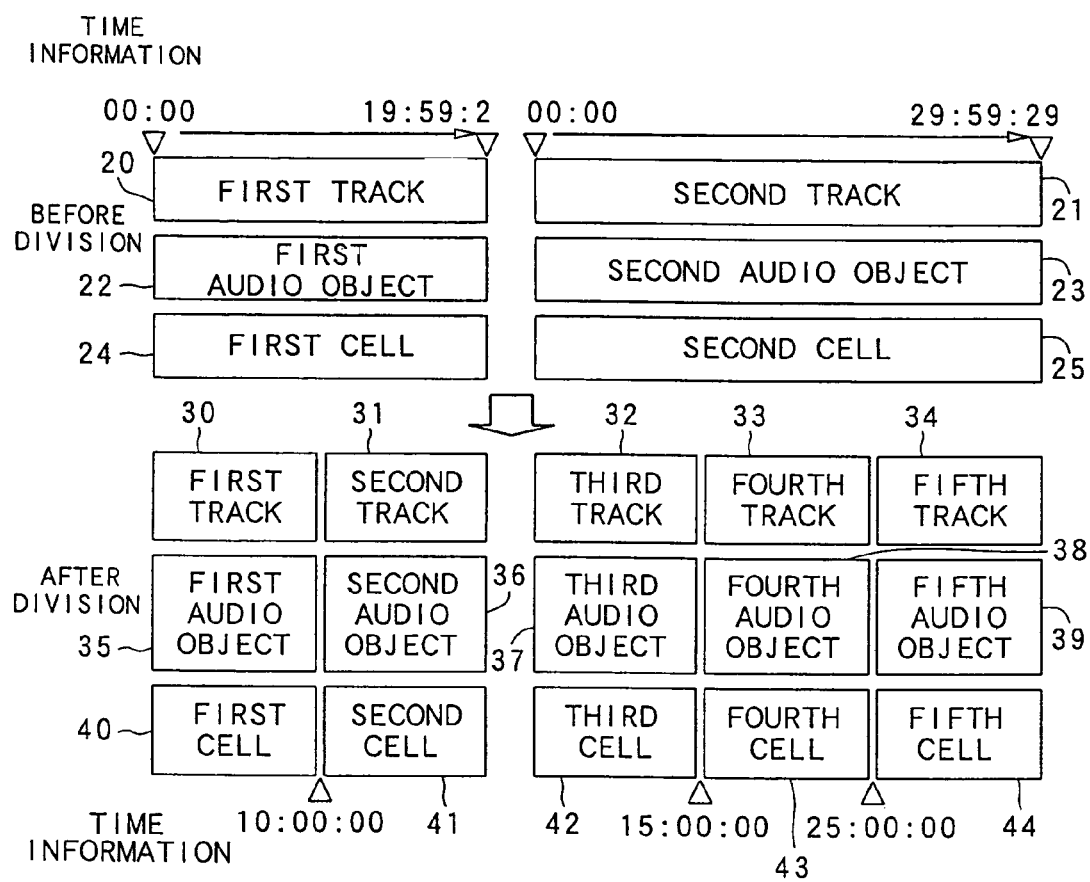
FIG. 5 is a diagram (I) for explaining track dividing processing according to the present embodiment.

Next, it is clearly explained how the object recording sequence information OSI is edited in the above editorial processing with reference to FIG. 5 and FIG. 6.

Additionally, according to a following explanation, in one DVD 1, a first track 20 having a reproduction time of 19 minutes, 59 seconds and 2 frames (1 frame is equivalent to 1/30 second) shown in the logical format in FIG. 5 is divided into a first track 30, of which reproduction time is just 10 minutes, and a second track 31, of which reproduction time is 9 minutes, 59 seconds and 2 frames. Simultaneously, according to a following explanation, a second track 21 having a reproduction time of 29 minutes, 59 seconds and 29 frames is divided into a third track 32, of which reproduction time is just 15 minutes, a fourth track 33, of which reproduction time is just 10 minutes, and a fifth track 34, of which reproduction time is 9 minutes, 59 seconds and 29 frames.

With respect to the logical format before and after division, a first audio object 22 and a first cell 24 are associated with the first track 20 before division. Simultaneously, a second audio object 23 and a second cell 25 are associated with the second track 21.

Alternatively, after division, a first audio object 35 and a first cell 40 are associated with the first track 30, a second audio object 36 and a second cell 41 are associated with the second track 31, a third audio object 37 and a third cell 42 are associated with the third track 32, a fourth audio object 38 and a fourth cell 43 are associated with the fourth track 33, and a fifth audio object 39 and a fifth cell 44 are associated with the fifth track 34, respectively.

At first, contents of the object recording sequence information OSI before division will be described by using FIG. 6A.

Figure 6A:
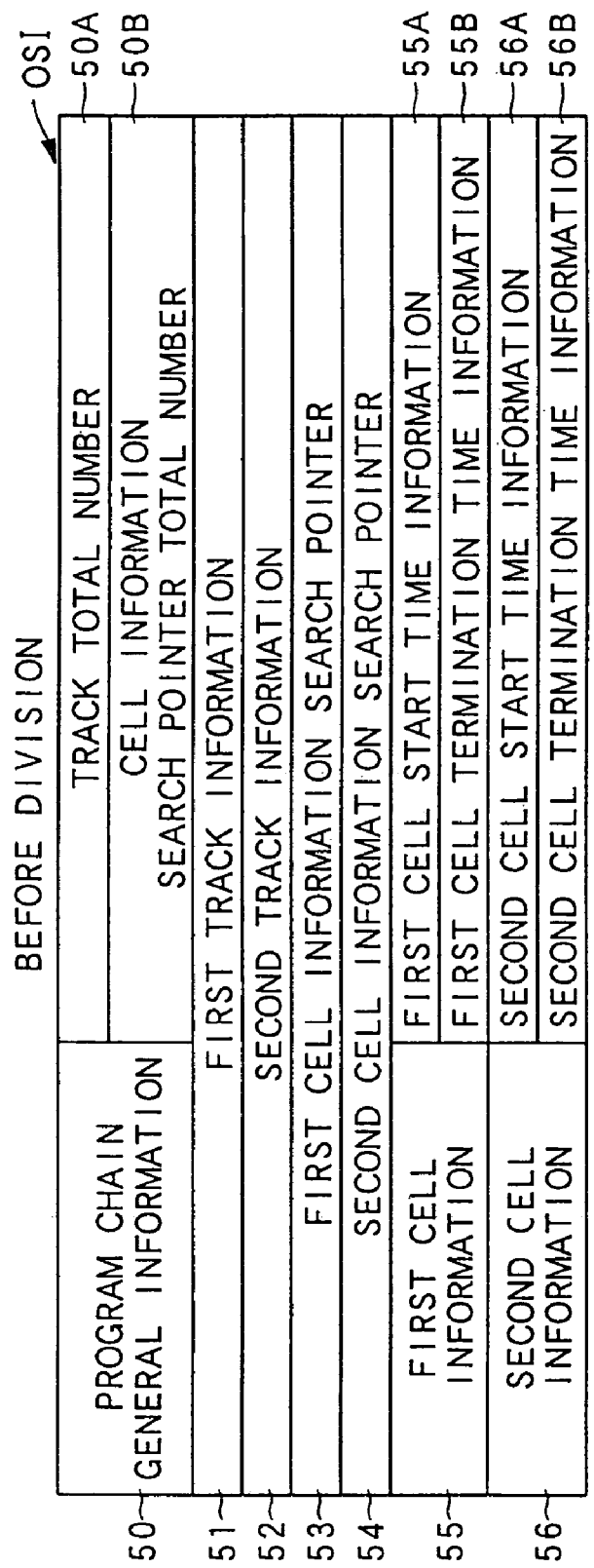
FIG. 6A is a diagram (II) for illustrating object recording sequence information before track dividing processing according to the present embodiment.

As shown in FIG. 6A, before division illustrated in FIG. 5, the object recording sequence information OSI includes a program chain general information 50, first track information 51 (its value is "1"), second track information 52 (its value is "1"), a first cell information search pointer 53, a second cell information search pointer 54, first cell information 55 and second cell information 56. The program chain general information 50 includes a track total number 50A (its value is 2'), in which—the total number of the tracks TR recorded in the DVD 1 is described, and a cell information search pointer total number 50B (its value is "2") in which the total number of the cell information search pointers to be described later is described. The total number of the cells CL included in the first track 20 before division is described in the first track information 51. The total number of the cells CL included in the second track 21 before division is described in the second track information 52. A recording position (recording address) on the DVD 1, in which the first cell information 55 to be described later is described, is described in the first cell information search pointer 53. A recording position on the DVD 1, in which the second cell information 56 to be described later is described, is described in the second cell information search pointer 54. The first cell information 55 includes first cell start time information 55A (its value is "0 minute, 0 second and 0 frame), in which a reproduction start time of the first cell 24 before division is described, and first cell termination time information 55B (its value is "19 minutes, 59 seconds and 2 frames), in which a reproduction termination time of the first cell 24 is described. The second cell information 56 includes second cell start time information 56A (its value is "0 minute, 0 second and 0 frame), in which a reproduction start time of the second cell 25 before division is described, and second cell termination time information 56B (its value is "29 minutes, 59 seconds and 29 frames), in which a reproduction termination time of the second cell 25 is described.

Next, contents of an object recording sequence information OSI' after respective tracks TR in associated with the object recording sequence—information OSI shown in FIG. 6A are divided by the above editorial processing in a form shown in FIG. 5 will be described with reference to FIG. 6B.

As shown in FIG. 6B, after division illustrated in FIG. 5, the object recording sequence information OSI' includes a program chain general information 60, first track information 61 (its value is "1"), second track information 62 (its value is "1"), third track information 63 (its value is "1"), fourth track information 64 (its value is "1"), fifth track information 65 (its value is "1"), first cell information search pointer 66, second cell information search pointer 67, third cell information search pointer 68, fourth cell information search pointer 69, fifth cell information search pointer 70, first cell information 71, second cell information 72, third cell information 73, fourth cell information 74 and fourth cell information 75. The program chain general information 60 includes a track total number 60A (its value is "5"), in which the total number of the tracks TR recorded in the DVD 1 is described, and a cell information search pointer total number 60B (its value is "5"), in which the total number of the corresponding cell information search pointers is described. The total number of the cells CL included in the first track 30 after division is described in the first track information 61. The total number of the cells CL included in the second track 31 after division is described in the second track information 62. The total number of the cells CL included in the third track 32 after division is described in the third track information 63. The total number of the cells CL included in the fourth track 33 after division is described in the fourth track information 64. The total number of the cells CL included in the fifth track 34 after division is described in the fifth track information 65. A recording position on the DVD 1, in which the first cell information 71 to be described later is described, is described in the first cell information search pointer 66. A recording position on the DVD 1, in which the second cell information 72 to be described later is described, is described in the second cell information search pointer 67. A recording position on the DVD 1, in which the third cell information 73 to be described later is described, is described in the third cell information search pointer 68. A recording position on the DVD 1, in which the fourth cell information 74 to be described later is described, is described in the fourth cell information search pointer 69. A recording position on the DVD 1, in which the fifth cell information 75 to be described later is described, is described in the fifth cell information search pointer 70. The first cell information 71 includes first cell start time information 71A (its value is "0 minute, 0 second and 0 frame), in which a reproduction start time of the first cell 40 after division is described, and first cell termination time information 71B (its value is "10 minutes, 0 second and 0 frame), in which a reproduction termination time of the first cell 40 is described. The second cell information 72 includes first cell start time information 72A (its value is 10 minutes, 0 second and 0 frame), in which a reproduction start time of the second cell 41 after division is described, and second cell termination time information 72B (its value is "19 minutes, 59 seconds and 2 frames), in which a reproduction termination time of the second cell 41 is described. The third cell information 73 includes third cell start time information 73A

(its value is "0 minute, 0 second and 0 frame), in which a reproduction start time of the third cell 42 after division is described, and third cell termination time information 73B (its value is "15 minutes, 0 second and 0 frame), in which a reproduction termination time of the third cell 42 is described. The fourth cell information 74 includes fourth cell start time information 74A (its value is "15 minutes, 0 second and 0 frame), in which a reproduction start time of the fourth cell 43 after division is described, and fourth cell termination time information 74B (its value is "25 minutes, 0 second and 0 frame), in which a reproduction termination time of the fourth cell 43 is described. The fifth cell information 75 includes fifth cell start time information 75A (its value is "25 minutes, 0 second and 0 frame), in which a reproduction start time of the fifth cell 44 after division is described, and fifth cell termination time information 75B (its value is "29 minutes, 59 seconds and 29 frames), in which a reproduction termination time of the fifth cell 44 is described.

If the editorial processing shown in FIG. 4 is performed again, the object recording sequence information OSI' shown in FIG. 6B is newly updated and recorded by the same processing as the processing such that the object recording sequence information OSI' is generated from the object recording sequence information OSI.

Next, the processing in the case of reproducing the audio information, which is recorded as respective tracks TR divided by the editorial processing according to the above described embodiment, will be described with reference to FIG. 7 and FIG. 8.

Alternatively, the reproduction processing is performed by the information recording reproduction apparatus S under control of the system controller 7 on the basis of the above object file information OFI or the like, which is generated after division.

Additionally, FIG. 7 is a diagram for explaining contents of the above object file information OFI, which is generated after the editorial processing, taking the cases shown in FIG. 5 and FIG. 6B as examples. FIG. 8 is a flow chart for showing the reproduction processing.

At first, the contents of the above object file information OFI after division will be described with reference to FIG. 7.

The object file information OFI, which is generated after the tracks TR are divided in embodiment shown in FIG. 5 and FIG. 6B, includes first object general information 80, first object unit information 81, second object general information 82, second object unit information 83, third object general information 84, third object unit information 85, fourth object general information 86, fourth object unit information 87 and fifth object general information 88 and fifth object unit information 89. The first object general information 80 is comprised of reproduction start time information 80A (its value is "0 minute and 0 second") of the first audio object 35 after division, reproduction termination time information 80B (its value is "10 minutes and 0 second") of the first audio object 35, other information 80C including other information necessary for reproduction of the first audio object 35, and a preparative area 80D. The first object unit information 81 is the above object unit information in associated with the first audio object 35. The second object general information 82 is comprised of reproduction start time information 82A (its value is "10 minutes and 0 second") of the second audio object 36 after division, reproduction termination time information 82B (its value is "19 minutes and 59 seconds") of the second audio object 36, other information 82C including other information neces- sary for reproduction of the second audio object 36, and a preparative area 82D. The second object unit information 83 is the above object unit information in associated with the second audio object 36. The third object general information 84 is comprised of reproduction start time information 84A (its value is "0 minute and 0 second") of the third audio object 37 after division, reproduction termination time information 84B (its value is "15 minutes and 0 second") of the third audio object 37, other information 84C including other information necessary for reproduction of the third audio object 37, and a preparative area 84D. The third object unit information 85 is the above object unit information in associated with the third audio object 37. The fourth object general information 86 is comprised of reproduction start time information 86A (its value is "15 minutes and 0 second") of the fourth audio object 38 after division, reproduction termination time information 86B (its value is "25 minutes and 0 second") of the fourth audio object 38, other information 86C including other information necessary for reproduction of the fourth audio object 38, and a preparative area 86D. The fourth object unit information 87 is the above object unit information in associated with the fourth audio object 38. The fifth object general information 0.88 is comprised of reproduction start time information 88A (its value is "25 minutes and 0 second") of the fifth audio object 39 after division, reproduction termination time information 88B (its value is "29 minutes and 59 seconds") of the fifth audio object 39, other information 88C including other information necessary for reproduction of the fifth audio object 39, and a preparative area 88D. The fifth object unit information 89 is the above object-unit information in associated with the fifth audio object 39.

Next, reproduction processing of an embodiment by the use of the object file information OFI or the like illustrated in FIG. 7 will be described with reference to FIG. 8.

Alternatively, the switch 12 is switched to the decoding signal Sd's side when the reproduction processing is performed.

Additionally, reproduction processing explained below is reproduction processing for searching a position after a time of Ts seconds from a head of the data area DA in the DVD 1 as a reproduction time and reproducing the audio information recorded in this position. In this case, reproduction time in associated with one audio object unit AOBU is assumed to be t seconds.

Figure 8:
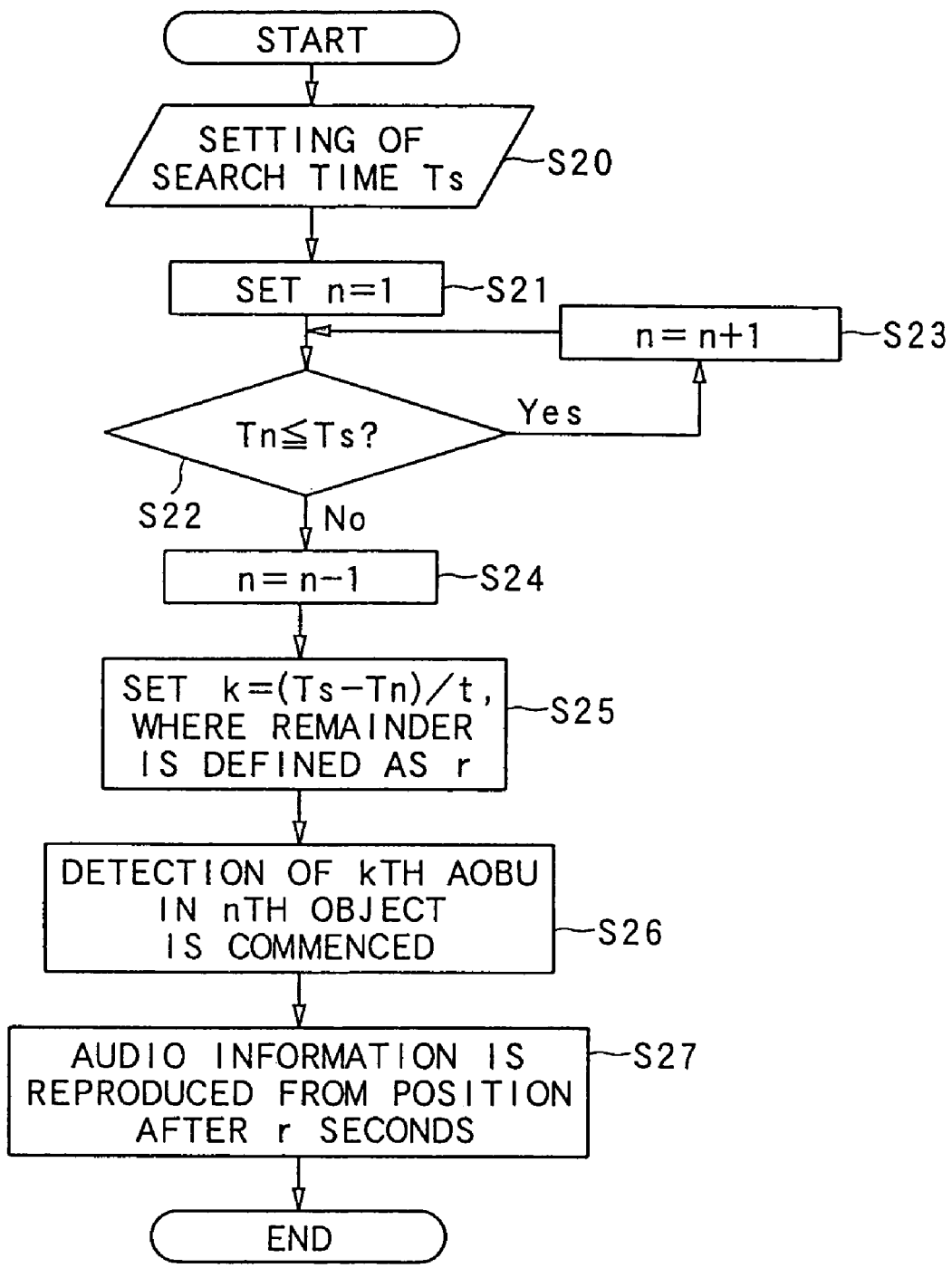
FIG. 8 is a flow chart for showing reproduction processing according to the present embodiment.

As shown in FIG. 8, according to the reproduction processing, at first, when the reproduction time Ts is designated by the user (step S20), a parameter n indicating the number of the audio object is set to "1" (step S21). The number is a continuous number in the case that the number of the audio object recorded in a head of the data area DA is assumed to be "1". Then, the reproduction time Tn at the head of the audio object to be illustrated by the parameter n is compared with the above reproduction time Ts (step S22).

If the reproduction time Tn is ahead of the reproduction time Ts (step S22; YES), it is assumed that the irradiating position of the optical beam B does not reach a desired reproduction position. Then, the parameter n is increased by "1" (step S23) and the processing returns to the step S22.

On one hand, if it is determined that the reproduction time Tn is behind of the reproduction time Ts in the step S22 (Step S22; NO), it is assumed that the irradiating position of the optical beam B passes the desired reproduction position by one audio object. Then, the parameter n is decreased by "1" (step S24). Therefore, a n-th audio object obtained by this processing is an audio object including the reproduction time Ts. Next, difference between the reproduction time Tn and the reproduction time Ts is divided by the reproduction time t of one audio object unit AOBU and its quotient is defined as k and its remainder is defined as r (step S25).

According to this processing in the step S25, it is perceived that the desired reproduction time Ts is equivalent to a position after r seconds from the head of the k-th audio object unit AOBU in the n-th audio object.

Next, detection of the k-th audio object unit AOBU is commenced (step S26). Further, the audio information is reproduced from a position after r seconds from the above position (step S27) and the processing is terminated.

As described above, according to the dividing processing of the track TR by edition of the object recording sequence OSI of the embodiment, generating the object recording sequence information OSI' after division to record it in the DVD 1 as shown in FIG. 6B is repeated every time the division is designated, so that it is possible to record the object recording sequence information OSI' for dividing the original track TR (the first track 20 and the second track 21) in a manner desired by the user to reproduce it.

Additionally, since the recorded audio information is reproduced and simultaneously division is designated, it is possible that the user confirms the contents of the audio information and simultaneously the object recording sequence information OSI' after division is generated.

Further, since respective cell information in the object recording sequence information OSI' include the reproduction time information of respective cells after division and the order information, it is possible that respective tracks after division are capable of being certainly reproduced in a reproduction manner, which is desired by the user.

Further, since the DVD 1 capable of recording is used as the information recording medium, large quantity of audio information can be recorded and simultaneously reproduced in such a manner that the user desired.

(III) Modified Embodiment

Next, a modified embodiment of the present invention will be described with reference to FIG. 9.

Figure 9:
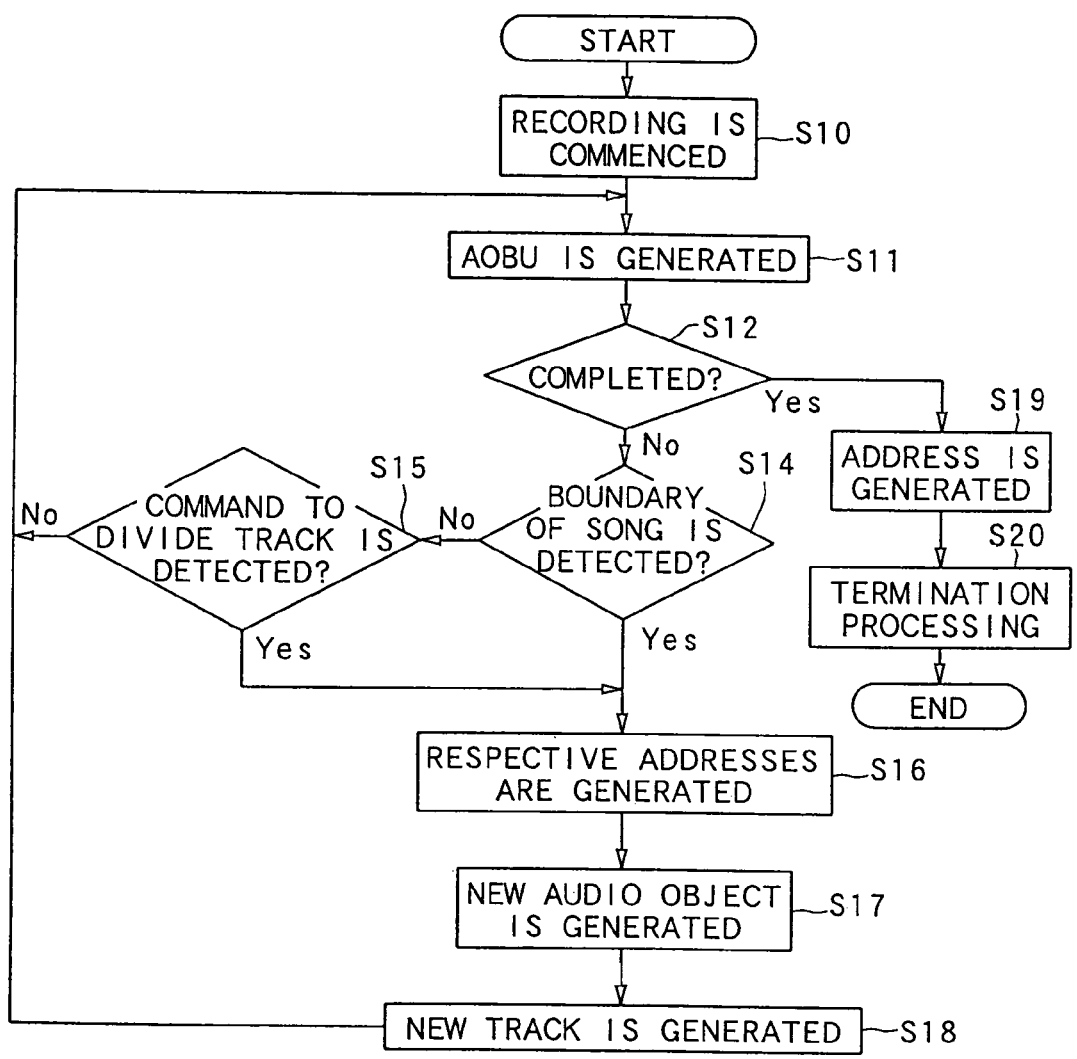
FIG. 9 is a flow chart for showing editorial processing according to the present embodiment.

FIG. 9 is a flow chart for illustrating editorial processing according to a modified embodiment of the present invention.

In the above described embodiment, the editorial processing for reproducing the audio information, which is once recorded, and simultaneously dividing the track TR is described. However, in addition to this, the present invention can be also applied to the case that a series of the audio information is divided and recorded upon recording this series of the audio information in the DVD 1, in which no audio information is recorded.

Since the configuration of the information recording reproduction apparatus according to the modified embodiment is the same as the configuration of the information recording reproduction apparatus S of the embodiment other than that the switch 12 is always switched to the recording information Sr's side, the explanation thereof is omitted below.

In the editorial processing in the modified embodiment, as shown in FIG. 9, at first, the audio information recording is commenced (step S10). Then, the audio object unit AOBU is generated by the above described processing to be recorded in the DVD 1 (step S11).

After that, it is determined whether or not the audio information recording is completed or not (step S12). If the recording processing is not completed (step S12; NO), then, it is determined whether a boundary of a song in the recording information Sr is detected (step S14).

In the above case, in the processing of the step S14, specifically, the boundary is detected at timing that the detecting circuit 6A in the timing generator 6 detects the silent portion of the recording information Sr.

When the boundary of the song is detected by the determination in the step S14 (step S14; YES), the address information of the recording termination position in the audio object to be reproduced before the boundary timing in the corresponding object recording sequence information OSI and the reproduction termination of the cell CL to be reproduced before the boundary timing are newly generated as the object recording sequence information OSI (step S16). Further, a new audio object and a new track TR are generated with respect to the audio information, which has been recorded up to the boundary (steps S17 and S18) and the processing returns to the step S11 so as to repeat the same processing at the boundary timing to come next.

On one hand, if the boundary of the song is not detected in the determination of the step S14 (step S14; NO), then, it is determined whether or not the operation signal Sin, which intends to divide the track TR generated up to that time, is inputted from the operation unit 15 (step S15). If the operation signal Sin is not inputted (step S15; NO), the processing shifts to the step S11 as it is. On the contrary, if it is inputted (step S15; YES), the processing shifts to the above step S16 and performs the above described processing thereafter.

If it is detected that recording processing is completely terminated in the determination of the step S12 (step S12; YES), then, the address information of the recording termination position in the last audio abject and the reproduction termination time of the last cell CL are generated as the object recording sequence information OSI (step S19). Then, the predetermined termination processing is performed (step S20) and the recording processing is terminated. The predetermined termination processing includes, for example, the processing of recording of the termination information to be recorded in the read out area LO or the like.

As the object recording sequence information OSI to be generated after the editorial processing shown in FIG. 9 is performed, for example, the object recording sequence information OSI illustrated in FIG. 6A is generated as well as the recording processing. In this case, the boundary of the song is detected in the audio information to be recorded only when ten minutes zero second has been passed after the recording is commenced.

As described above, according to the editorial processing of the object recording sequence information OSI in the modified embodiment, the object recording sequence information OSI before and after the boundary of the song is generates in such a manner that it is shown in FIG. 6A and simultaneously, recording the audio information is repeated for each boundary timing of the song. As a result, it is possible to record the object recording sequence information OSI for dividing and reproducing the recording information Sr in such a manner that the user desires as well as it is possible to divide and record the recording information Sr to be continuously inputted in such a manner that the user desires in the DVD 1.

Additionally, since respective cell information in the object recording sequence information OSI include the reproduction time information and the order information of respective cells after division, it is possible to certainly reproduce respective tracks after division in such a reproduction manner that the user desires.

Further, since the DVD 1 capable of recording is used as the information recording medium, large quantity of the audio information is capable of being recorded as well as this is capable of being reproduces in such a reproduction manner that the user desires.

Alternatively, the present invention is not limited to the above described embodiment.

In other words, for example, in the processing shown in FIG. 4, it is described that the audio object is divided when the operation signal Sin indicating that respective tracks TR are divided from the operation unit 15. However, in addition to this, the audio object may be automatically divided in response to that the detector 6A detects the silent portion of the decoding signal Sd.

Additionally, according to the above described embodiment and the modified embodiment, the present invention is applied to the audio DVD recorder, which employs the audio DVD standard. However, in addition to this, the present invention may be applied to the video DVD recorder, which employs a standard of the video DVD.

The invention may be embodied in other specific forms without departing from the spirit or essential characteristics thereof. The present embodiments are therefore to be considered in all respects as illustrative and not restrictive, the scope of the invention being indicated by the appended claims rather than by the forgoing description and all changes which come within the meaning and range of equivalency of the claims are therefore intended to be embraces therein.

The entire disclosure of Japanese Patent Application No. 2000-104027 filed on Apr. 5, 2000 including the specification, claims, drawings and summary is incorporated herein by reference in its entirety.

What is claimed is:

1. An information recording apparatus for recording information on an information recording medium, comprising:
   a detecting device which detects a division timing in the recording information;
   a recording device which records former part recording information which is the recording information before the division timing and latter part recording information which is the recording information after the division timing, on the information recording medium; and
   a generating device which generates control information including former control information corresponding to the former part recording information and latter control information corresponding to the latter part recording information,
   wherein the recording device records the control information on the information recording medium, and
   wherein the control information further includes former pointer information indicating a location of the former control information and latter pointer information indicating a location of the latter control information.

2. The apparatus according to claim 1, wherein the recording information includes at least one information object corresponding to one continuous recording, and
   wherein the former part recording information and latter part recording information are recorded as separate information objects.

3. The apparatus according to claim 2, wherein each information object includes at least one information cell, and
   wherein the former control information includes a reproduction start time information of the information cell in the former part recording information and the latter control information includes a reproduction start time information of the information cell in the latter part recording information.

4. The apparatus according to claim 2, wherein the generating device further generates object information table includes address information and time information indicating a start time and end time of each information object,
   wherein the object information table is recorded as separate information from the control information.

5. The apparatus according to claim 1, wherein the detecting device detects the division timing in response to a user's operation.

6. The apparatus according to claim 1, wherein the recording information includes audio information, and
   wherein the detecting device detects a silent portion in the audio information as the division timing.

7. The apparatus according to claim 1, wherein the detecting device detects boundary information in the recording information as the division timing.

8. The information recording apparatus according to claim 1,
   wherein the recording device records the recording information and the control information on the information recording medium, the control information being for reproducing the recording information as a second logical unit including at least one first logical unit indicating a predetermined recording information,
   wherein the generating device generates the former control information and the latter control information, the former control information being for reproducing the former part recording information corresponding to recording information before the division timing as the second logical unit, the latter control information being for the latter part recording information corresponding to recording information after the division timing as the second logical unit, and
   wherein the generating device generates the control information by dividing the first logical unit at the division timing.

9. An information editing apparatus for editing recording information recorded on an information recording medium, comprising:
   a detecting device which detects a division timing in the recording information,
   a generating device which generates control information including former control information corresponding to the former part recording information which is the recording information before the division timing and latter control information corresponding to the latter part recording information which is the recording information after the division timing, and
   a recording information recording/reading device which records the recording information on the information recording medium and reads the recording information from the information recording medium,
   wherein the recording information recording/reading device records the control information generated by the generating device on the information recording medium, and
   wherein the control information further includes former pointer information indicating a location of the former control information and latter pointer information indicating a location of the latter control information.

10. The apparatus according to claim 9, wherein the recording information includes at least one information object corresponding to one continuous recording, and wherein the former part recording information and latter part recording information are defined as separate information objects.

11. The apparatus according to claim 10, wherein each information object includes at least one information cell, and
wherein the former control information includes a reproduction start time information of the information cell in the former part recording information and the latter control information includes a reproduction start time information of the information cell in the latter part recording information.

12. The apparatus according to claim 10, wherein the generating device further generates object information table as separate information from the control information, which includes address information and time information indicating a start time and end time of each information object.

13. The apparatus according to claim 9, wherein the detecting device detects the division timing in response to a user's operation.

14. The apparatus according to claim 9, wherein the recording information includes audio information, and
wherein the detecting device detects a silent portion in the audio information as the division timing.

15. The apparatus according to claim 9, wherein the detecting device detects boundary information in the recording information as the division timing.

16. The information editing apparatus according to claim 9,
wherein the recording information recording/reading device records the recording information and the control information on the information recording medium, the control information being for reproducing the recording information as a second logical unit including at least one first logical unit indicating a predetermined recording information,
wherein the generating device generates the former control information and the latter control information, the former control information being for reproducing the former part recording information corresponding to recording information before the division timing as the second logical unit, the latter control information being for the latter part recording information corresponding to recording information after the division timing as the second logical unit, and
wherein the generating device generates the control information by dividing the first logical unit at the division timing.

17. An information recording method of recording information on an information recording medium, comprising the processes of:
detecting a division timing in the recording information;
recording former part recording information which is the recording information before the division timing and latter part recording information which is the recording information after the division timing, on the information recording medium; and
generating control information including former control information corresponding to the former part recording information and latter control information corresponding to the latter part recording information,
wherein the process of recording records the control information on the information recording medium, and
wherein the control information further includes former pointer information indicating a location of the former control information and latter pointer information indicating a location of the latter control information.

18. The method according to claim 17, wherein the recording information includes at least one information object corresponding to one continuous recording, and
wherein the former part recording information and latter part recording information are recorded as separate information objects.

19. The method according to claim 18, wherein each information object includes at least one information cell, and
wherein the former control information includes a reproduction start time information of the information cell in the former part recording information and the latter control information includes a reproduction start time information of the information cell in the latter part recording information.

20. The method according to claim 18, wherein the process of generating further generates object information table includes address information and time information indicating a start time and end time of each information object,
wherein the object information table is recorded as separate information from the control information.

21. The method according to claim 17, wherein the process of detecting detects the division timing in response to a user's operation.

22. The method according to claim 17, wherein the recording information includes audio information, and
wherein the process of detecting detects a silent portion in the audio information as the division timing.

23. The method according to claim 17, wherein the process of detecting detects boundary information in the recording information as the division timing.

24. The information recording method according to claim 17,
wherein the process of recording records the recording information and the control information on the information recording medium, the control information being for reproducing the recording information as a second logical unit including at least one first logical unit indicating a predetermined recording information,
wherein the process of generating generates the former control information and the latter control information, the former control information being for reproducing the former part recording information corresponding to recording information before the division timing as the second logical unit, the latter control information being for the latter part recording information corresponding to recording information after the division timing as the second logical unit, and
wherein the process of generating generates the control information by dividing the first logical unit at the division timing.

25. An information editing method of editing recording information recorded on an information recording medium, comprising the processes of:
detecting a division timing in the recording information,
generating control information including former control information corresponding to the former part recording information which is the recording information before the division timing and latter control information corresponding to the latter part recording information which is the recording information after the division timing, and
recording the recording information on the information recording medium, and reading the recording information from the information recording medium, wherein the process of recording information records the control information generated by the process of generating on the information recording medium, and wherein the control information further includes former pointer information indicating a location of the former control information and latter pointer information indicating a location of the latter control information.

26. The method according to claim 25, wherein the recording information includes at least one information object corresponding to one continuous recording, and wherein the former part recording information and latter part recording information are defined as separate information objects.

27. The method according to claim 26, wherein each information object includes at least one information cell, and wherein the former control information includes a reproduction start time information of the information cell in the former part recording information and the latter control information includes a reproduction start time information of the information cell in the latter part recording information.

28. The method according to claim 26, wherein the process of generating further generates object information table as separate information from the control information, which includes address information and time information indicating a start time and end time of each information object.

29. The method according to claim 25, wherein the process of detecting detects the division timing in response to a user's operation.

30. The method according to claim 25, wherein the recording information includes audio information, and wherein the process of detecting detects a silent portion in the audio information as the division timing.

31. The method according to claim 25, wherein the process of detecting detects boundary information in the recording information as the division timing.

32. The information editing method according to claim 17, wherein the process of recording records the recording information and the control information on the information recording medium, the control information being for reproducing the recording information as a second logical unit including at least one first logical unit indicating a predetermined recording information, wherein the process of generating generates the former control information and the latter control information, the former control information being for reproducing the former part recording information corresponding to recording information before the division timing as the second logical unit, the latter control information being for the latter part recording information corresponding to recording information after the division timing as the second logical unit, and wherein the process of generating generates the control information by dividing the first logical unit at the division timing.

* * * * *